J. KOSMAN AND M. GRZESIK.
HORSESHOE.
APPLICATION FILED JULY 8, 1921.
1,436,810. Patented Nov. 28, 1922.
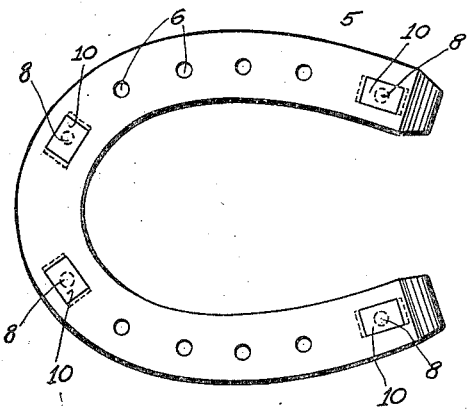
Fig. 1
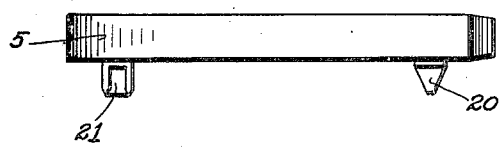
Fig. 2
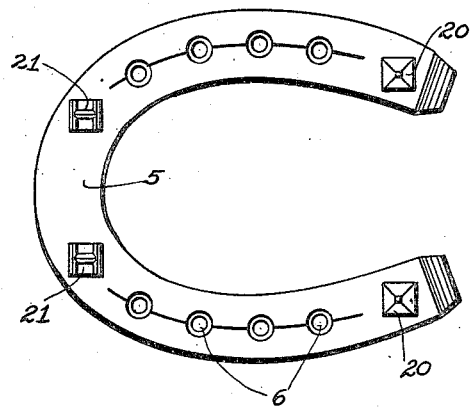
Fig. 3
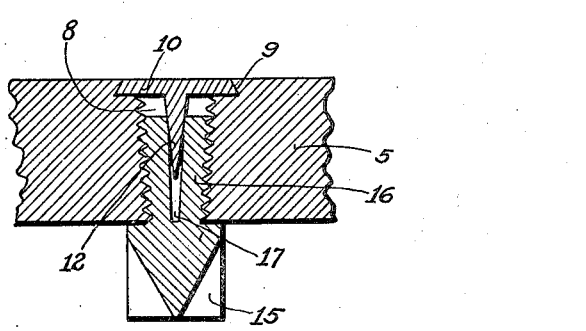
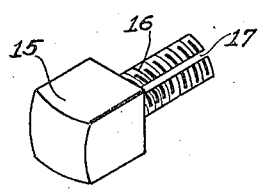
Fig. 4
Fig. 5
INVENTORS
John Kosman
Marcin Grzesik
BY
ATTORNEY Patented Nov. 28, 1922.

1,436,810

UNITED STATES PATENT OFFICE.

JOHN KOSMAN AND MARCIN GRZESIK, OF BROOKLYN, NEW YORK.

HORSESHOE.

Application filed July 8, 1921. Serial No. 483,190.

*To all whom it may concern:*

Be it known that we, JOHN KOSMAN and MARCIN GRZESIK, citizens of the United States and Poland, respectively, residing at Brooklyn, in the county of Kings and State of New York, have invented certain new and useful Improvements in Horseshoes, of which the following is a specification.

The principal object of this invention is to provide a horse shoe of ordinary form with calks adapted to be removed when worn and readily replaced with new ones as required.

Another object is the provision made whereby calks having a screw threaded slotted portion may be rigidly engaged within taper threaded annular openings formed in a horse shoe body.

A third object is the means provided for automatically spreading a calk while being screwed into the shoe.

These and other like objects are attained by the novel construction and arrangement of parts described in the specifications and shown in the accompanying drawings, forming a material part of this disclosure and in which:—

Figure 1 is a top plan view of a horse shoe, showing the calk spreaders in place.

Figure 2 is a side elevational view of Figure 3.

Figure 3 is a bottom plan view of the shoe showing calks of different forms in position.

Figure 4 is a perspective view of a calk blank.

Figure 5 is a fragmentary sectional view showing a calk and spreader assembled to a shoe.

Referring to the drawing in detail, the numeral 5 indicates a horse shoe having a plurality of openings 6 adapted to receive nails for attaching to the hoof in the usual manner.

Conically tapered screw threaded openings 8, near the heel and toe portions, preformed in the shoe and adjacent the openings, upon the inner side, are rectangular undercut depressions 9 adapted to engage and hold, by riveting or upsetting, the rectangular flat head 10 of spreading units, each being beveled on two opposite sides and having a central tapered projecting prong 12. The tapered threaded openings 8 have their largest diameters adjacent the inner side of the shoe and communicate with the depressions 9.

A calk unit, comprising a head 15 and an integral screw threaded element 16 is formed with a slot 17, positioned along the axis of the threaded portion.

By reference to Figure 5 it will be seen that as the calk is screwed into the openings in the shoe 5, the tapered spreader prong 12 enters the slot 17 and further advancement causes a wedgelike action between the element 12 and sides of the slot, expanding the threaded portion 16 outwardly into rigid engagement with the walls of the tapered threaded openings 8.

A reverse turn of the calk releases the wedging action and the calk may be readily removed.

Referring to Figure 4 a calk blank is shown having a rectangular head from which may be produced varied forms adapted to the purpose, the preferred one being shown as at 20 in Figure 3 and modifications, as at 21, in the same figure.

Having thus described our invention what we claim as new and desire to secure by Letters Patent, is:—

A horseshoe provided with a removable calk, comprising in combination with a shoe body having a tapered screw threaded opening therethrough, the base of the opening being uppermost, a flat rectangular head fixed in said body, a conical projection on said head extending axially into the opening nearly to the bottom thereof, a calk and a screw threaded stem extending therefrom suited to engage the mentioned opening from the smaller end thereof, said stem being cleft and suited to be spread by engagement with said projection.

In witness whereof we affix our signatures.

JOHN KOSMAN.
MARCIN GRZESIK.